(12) United States Patent
Seidl et al.

(10) Patent No.: US 7,631,888 B2
(45) Date of Patent: Dec. 15, 2009

(54) GAS GENERATOR AND A GAS BAG MODULE

(75) Inventors: Johann Seidl, Toeging (DE); Karl Englbrecht, Erharting (DE)

(73) Assignee: TRW Airbag Systems GmbH, Aschau am Inn (DE)

( * ) Notice: Subject to any disclaimer, the term of this patent is extended or adjusted under 35 U.S.C. 154(b) by 396 days.

(21) Appl. No.: 11/268,318

(22) Filed: Nov. 7, 2005

(65) Prior Publication Data
US 2006/0097490 A1   May 11, 2006

(30) Foreign Application Priority Data
Nov. 10, 2004 (DE) .................. 20 2004 017 428 U

(51) Int. Cl.
*B60R 21/217* (2006.01)
(52) U.S. Cl. ............... 280/728.2; 280/736; 280/741
(58) Field of Classification Search .......... 102/530, 102/531; 411/171; 280/728.2, 736, 741; *B60R 21/217*
See application file for complete search history.

(56) References Cited

U.S. PATENT DOCUMENTS

| | | | | |
|---|---|---|---|---|
| 2,077,600 A | * | 4/1937 | Watson | 219/113 |
| 2,623,974 A | * | 12/1952 | Prucha | 219/93 |
| 2,822,850 A | * | 2/1958 | McLaughlin | 411/171 |
| 2,836,787 A | * | 5/1958 | Seider | 323/318 |
| 2,908,310 A | * | 10/1959 | Grey | 411/171 |
| 2,936,806 A | * | 5/1960 | Harper | 411/171 |
| 3,045,735 A | * | 7/1962 | Kern | 411/171 |
| 4,119,827 A | * | 10/1978 | Lenox | 219/98 |
| 4,919,897 A | * | 4/1990 | Bender et al. | 422/165 |
| 4,988,119 A | * | 1/1991 | Hartmeyer | 280/728.2 |
| 5,000,479 A | * | 3/1991 | Werner et al. | 280/736 |
| 5,064,218 A | * | 11/1991 | Hartmeyer | 280/728.2 |
| 5,406,889 A | * | 4/1995 | Letendre et al. | 102/201 |
| 5,533,850 A | * | 7/1996 | Ishihara et al. | 411/171 |
| 5,542,701 A | * | 8/1996 | Rion | 280/735 |
| 5,568,936 A | * | 10/1996 | Spilker et al. | 280/728.2 |
| 5,813,695 A | * | 9/1998 | O'Driscoll et al. | 280/741 |
| 6,176,511 B1 | * | 1/2001 | Adkisson et al. | 280/728.2 |
| 6,213,502 B1 | * | 4/2001 | Ryan et al. | 280/736 |

(Continued)

FOREIGN PATENT DOCUMENTS

DE   4016046 A1 * 11/1991

(Continued)

OTHER PUBLICATIONS

U.S. Appl. No. 10/650,237, filed Aug. 28, 2003.

(Continued)

*Primary Examiner*—Paul N Dickson
*Assistant Examiner*—Laura Freedman
(74) *Attorney, Agent, or Firm*—Tarolli, Sundheim, Covell & Tummino LLP

(57) ABSTRACT

A gas generator has a cylindrical gas generator housing (22) and a connecting piece (14) which is welded to the gas generator housing (22). The connecting piece (14) has extensions (28) spaced apart in peripheral direction on the side facing the gas generator housing (22) and has a recess (31) between the extensions (28). The connecting piece (14) is welded to the gas generator housing (22) at the extensions (28).

10 Claims, 5 Drawing Sheets

U.S. PATENT DOCUMENTS

| | | | | |
|---|---|---|---|---|
| 6,644,902 | B1 * | 11/2003 | Cutshall | 411/111 |
| 7,419,183 | B2 * | 9/2008 | Tokuda et al. | 280/737 |
| 2004/0026910 | A1 * | 2/2004 | Englbrecht et al. | 280/736 |
| 2004/0200883 | A1 * | 10/2004 | Staheli et al. | 228/112.1 |

FOREIGN PATENT DOCUMENTS

| | | |
|---|---|---|
| DE | 10240639 | 2/2004 |
| DE | 202004011078 | 11/2004 |
| EP | 0316119 | 5/1989 |
| EP | 1396396 | 3/2004 |
| EP | 1396397 | 3/2004 |
| EP | 1473200 | 11/2004 |
| JP | 09058397 | 3/1997 |

OTHER PUBLICATIONS

U.S. Appl. No. 10/834,471, filed Apr. 29, 2004.
U.S. Appl. No. 10/653,510, filed Sep. 2, 2003.
U.S. Appl. No. 10/648,961, filed Aug. 27, 2003.

* cited by examiner

GAS GENERATOR AND A GAS BAG MODULE

TECHNICAL FIELD

The invention relates to a gas generator with a cylindrical gas generator housing and with a connecting piece which is welded on the gas generator housing, and a gas bag module.

BACKGROUND OF THE INVENTION

High requirements are set with regard to strength and tightness for a connection between a gas generator housing and a connecting piece. In the connecting region, the bursting strength of the tube is not to be reduced by welding the connecting piece to the gas generator. Preferably, the two parts are connected with each other by welding which, however, could be problematic if the material structure would be altered in an undesirable manner owing to too high input of heat by the gas generator housing having thin walls. If a connecting piece is welded to a gas generator housing, it is in fact especially the peripheral wall which is weakened by the welding as a result of changes to the structure.

The invention is based on the problem of producing a gas generator, on the gas generator housing of which a connecting piece is fastened with minimum effort and through the fastening of which the bursting pressure of the gas generator housing is not reduced.

BRIEF SUMMARY OF THE INVENTION

According to the invention, a gas generator includes a cylindrical gas generator housing and a connecting piece which is welded to the gas generator housing. The connecting piece has extensions spaced apart in peripheral direction on the side facing the gas generator housing and has a recess between the extensions. The connecting piece is welded to the gas generator housing at the extensions, especially directly to the peripheral wall of the gas generator.

The cylindrical housing preferably contacts the connecting piece here exclusively via the extensions. The advantages achieved with the invention consist in particular in that the strength requirements for the connection between the gas generator housing and the connecting piece can be achieved without a great effort. Through the welding lines or—spots, lying far apart in peripheral direction, the stress concentration in the weld seams and in the housing is also reduced. The connecting piece is laterally welded to the gas generator.

According to a preferred embodiment, in addition extensions are provided which are spaced axially in relation to the housing. This means that at least three extensions are welded to the housing, namely two extensions spaced in peripheral direction and at least one additional extension which lies staggered hereto in axial direction.

The connecting piece is preferably welded to the gas generator housing via at least two contact lines. Through the contact lines, the length of the weld seams increases, which leads to a reduction of the stressing of the individual weld seams and thereby to a better distribution of forces and stress.

The contact lines are arranged for example parallel to each other. This leads likewise to a better distribution of forces and stress.

Preferably, the connecting piece receives an ignition arrangement. This is advantageous, because it may be necessary because of space that the ignition arrangement of the gas generator has to be arranged outside the gas generator housing.

A seal can be arranged between the connecting piece and the gas generator housing. Here, the seal is constructed for example as an O-ring or cylindrical sealing element. The seal ensures a gas-tight connection.

According to a preferred embodiment, an angle between the extensions, which are spaced apart in peripheral direction, starting from the central point of the gas generator housing, amounts to between 15 degrees and 90 degrees. Angles which are greater than 90 degrees can lead to welding problems, whereas angles below 15 degrees can lead to strength problems. The optimum angle of such a connection amounts to between 30 degrees and 50 degrees.

The connecting piece can be welded to the gas generator housing by means of condenser discharge welding. This welding method is advantageous owing to the low temperature rise during welding. A temperature rise can be problematic, because the gas generator housing or respectively the connecting piece have ignitable gas and an ignition arrangement.

The connecting piece is, for example, a fastener for the gas generator.

The connecting piece preferably has a pin-shaped section and a flange section on the housing side, the flange section having the extensions. Thereby, the flange section and the pin-shaped section can respectively be adapted to their partially different requirements.

The pin-shaped section and the flange section can form a pre-assembled unit, preferably in one piece. Thereby, the gas generator can be adapted to the given conditions. Alternatively to this, it would also be possible to produce the pin-shaped section and the flange section from two parts.

According to an embodiment, the flange section is plate-shaped and projects laterally with respect to the pin-shaped section. Thereby, the overall weld seam length is increased, which leads to a reduction in the stressing of the individual weld seams. Furthermore, the side of the flange section facing away from the generator housing is available for the clamping of parts of the module.

The invention further relates to a gas bag module with a gas generator according to the invention.

Preferably, a module wall is clamped between the flange section and a holding piece. Thereby, the flux of force changes on filling of the gas bag module. The forces of the gas bag, unfolding partially unsymmetrically, are conducted directed into the connecting piece and not via the gas generator housing into the weld seams and into the connecting piece. This has the result that the weld seams can be dimensioned smaller and are subjected to lower stresses.

A transverse strut is preferably arranged between two connecting pieces which are arranged parallel to each other, the gas bag being clamped between the transverse strut and the module wall. As, on unfolding of the gas bag, the module wall lies against the gas generator possibly between the two connecting pieces which are arranged parallel to each other, forces can arrive into the gas generator. The transverse strut receives these forces and thus assists in keeping the forces away from the gas generator.

BRIEF DESCRIPTION OF THE PREFERRED EMBODIMENTS

Figure 1:
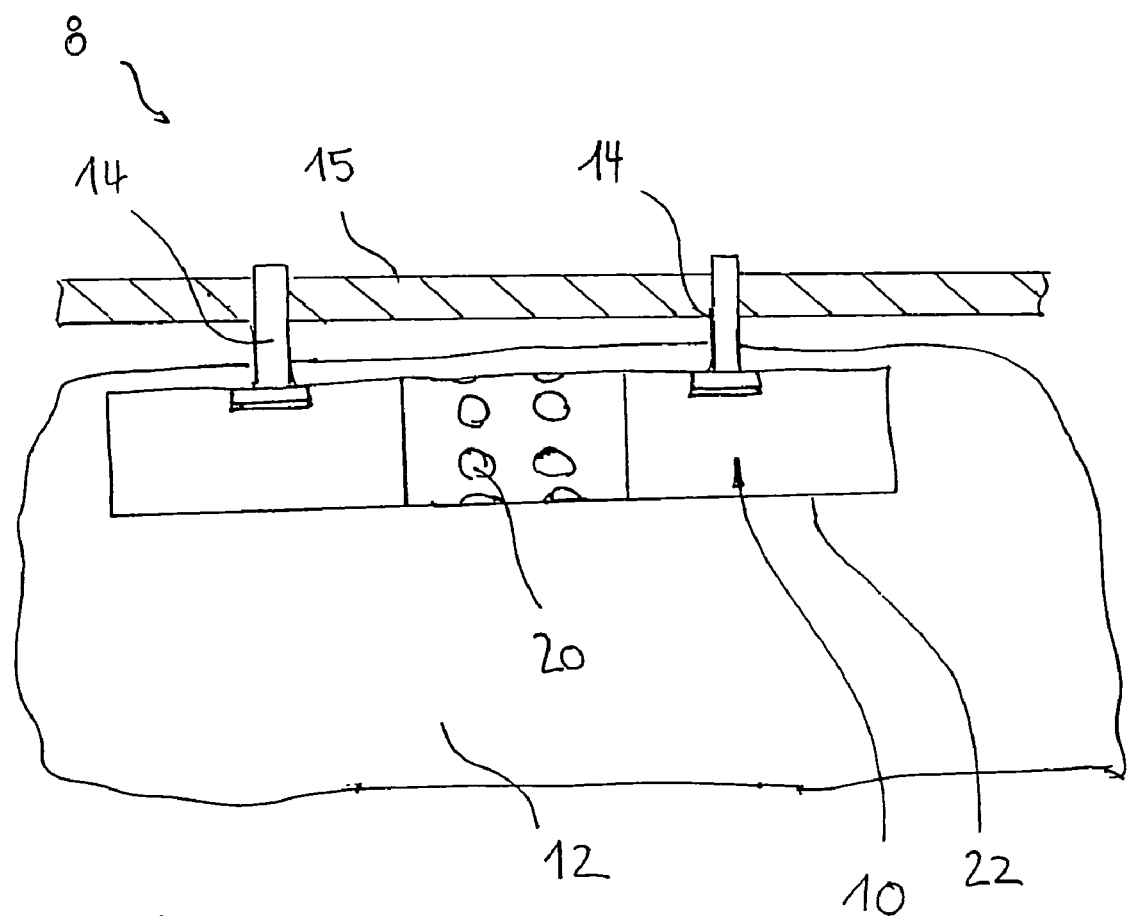
FIG. 1 shows a diagrammatic view of a gas bag module according to the invention with a gas generator according to the invention.

FIG. 1 shows a gas bag module 8, with a gas generator 10, which has a gas generator housing 22 and is surrounded by a gas bag 12. After the activation of the gas generator 10, the gas can emerge via outflow openings 20 and fill the gas bag 12. The gas generator 10 is fastened to a module wall 15 by means of connecting pieces 14. The connecting pieces 14 can also receive an ignition arrangement 16 of the gas generator 10 and are explained in further detail below.

Figure 2:
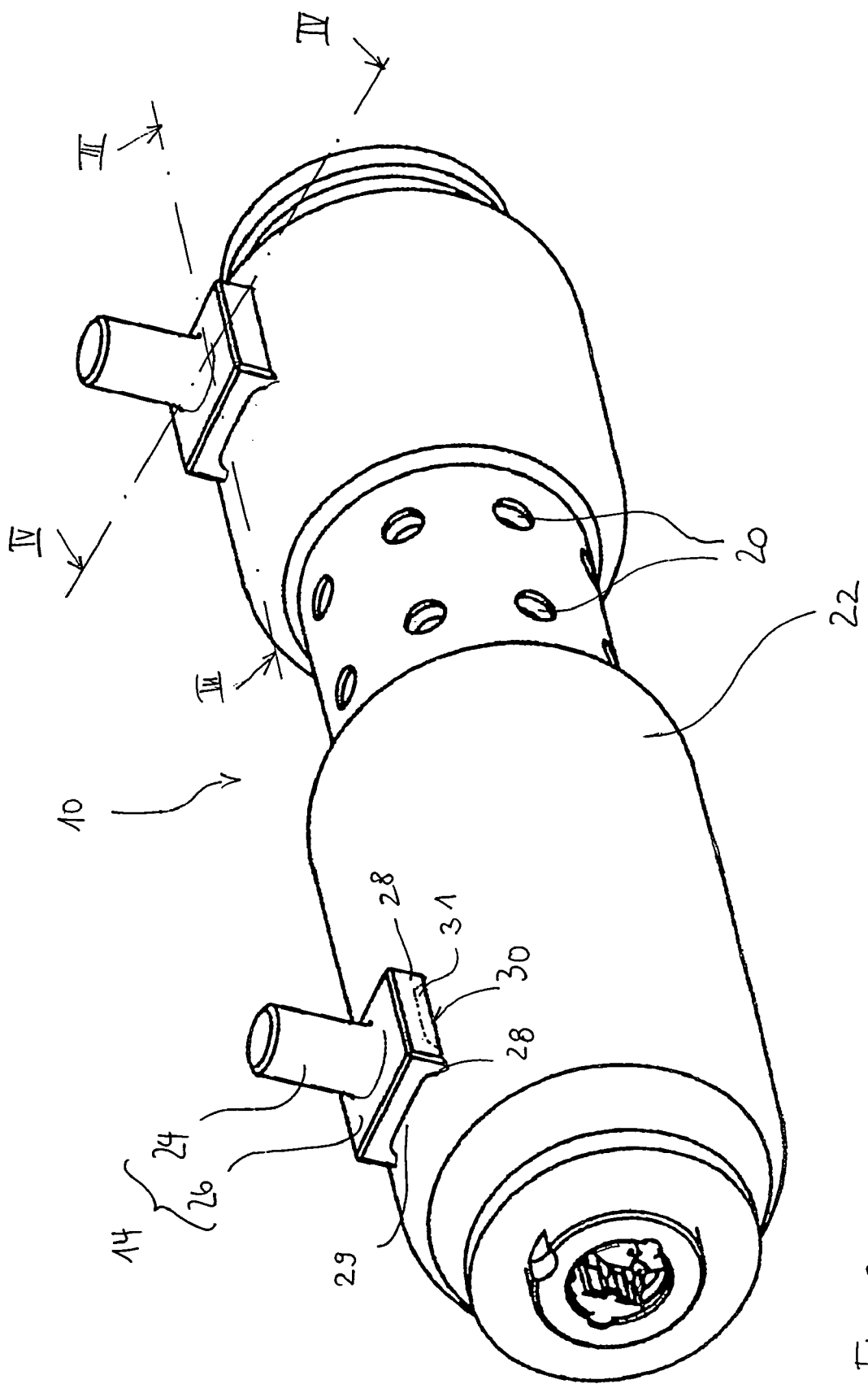
FIG. 2 shows a perspective view of the gas generator according to the invention.
Figure 3:
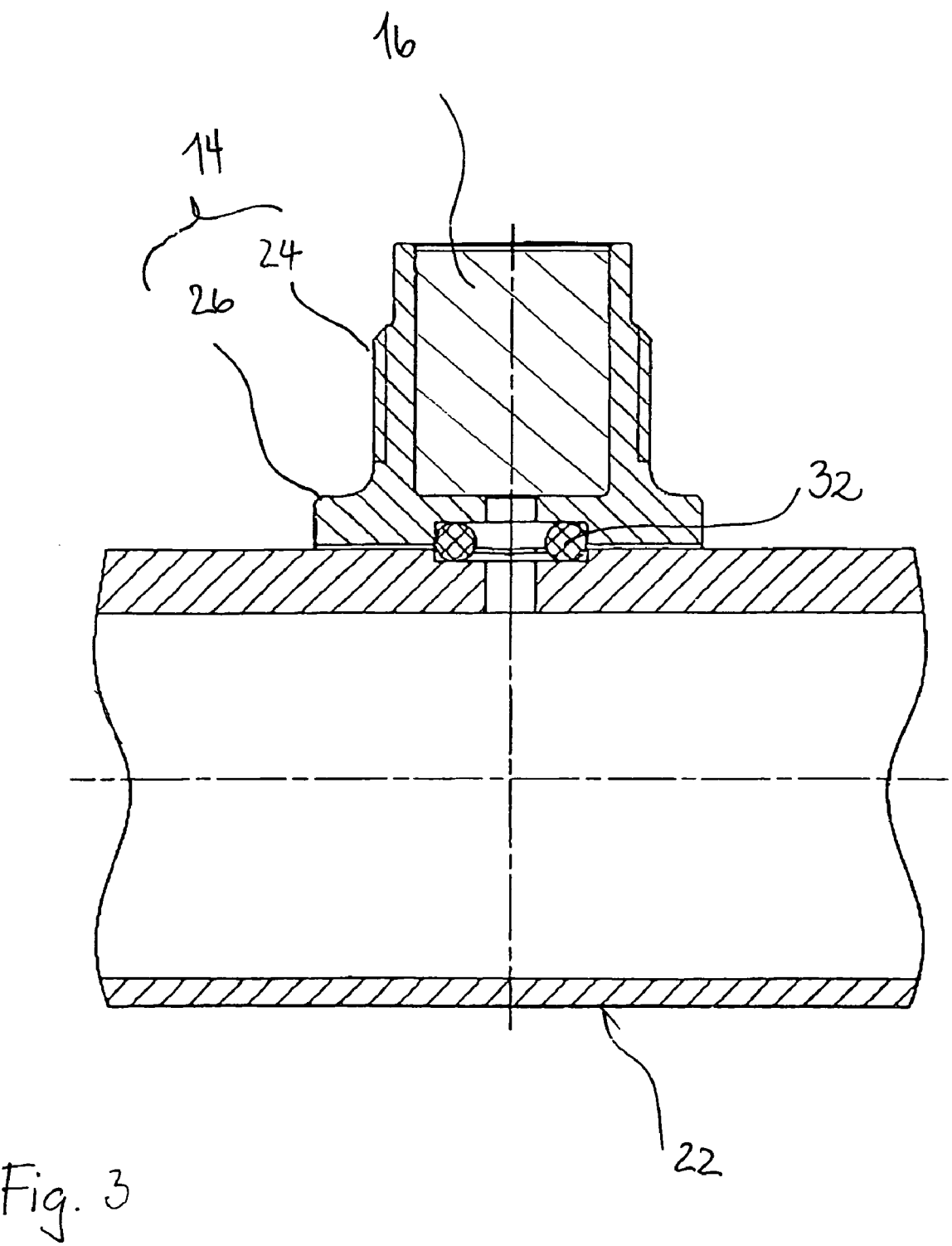
FIG. 3 shows a sectional view of the gas generator along the line III-III in FIG. 2.
Figure 4:
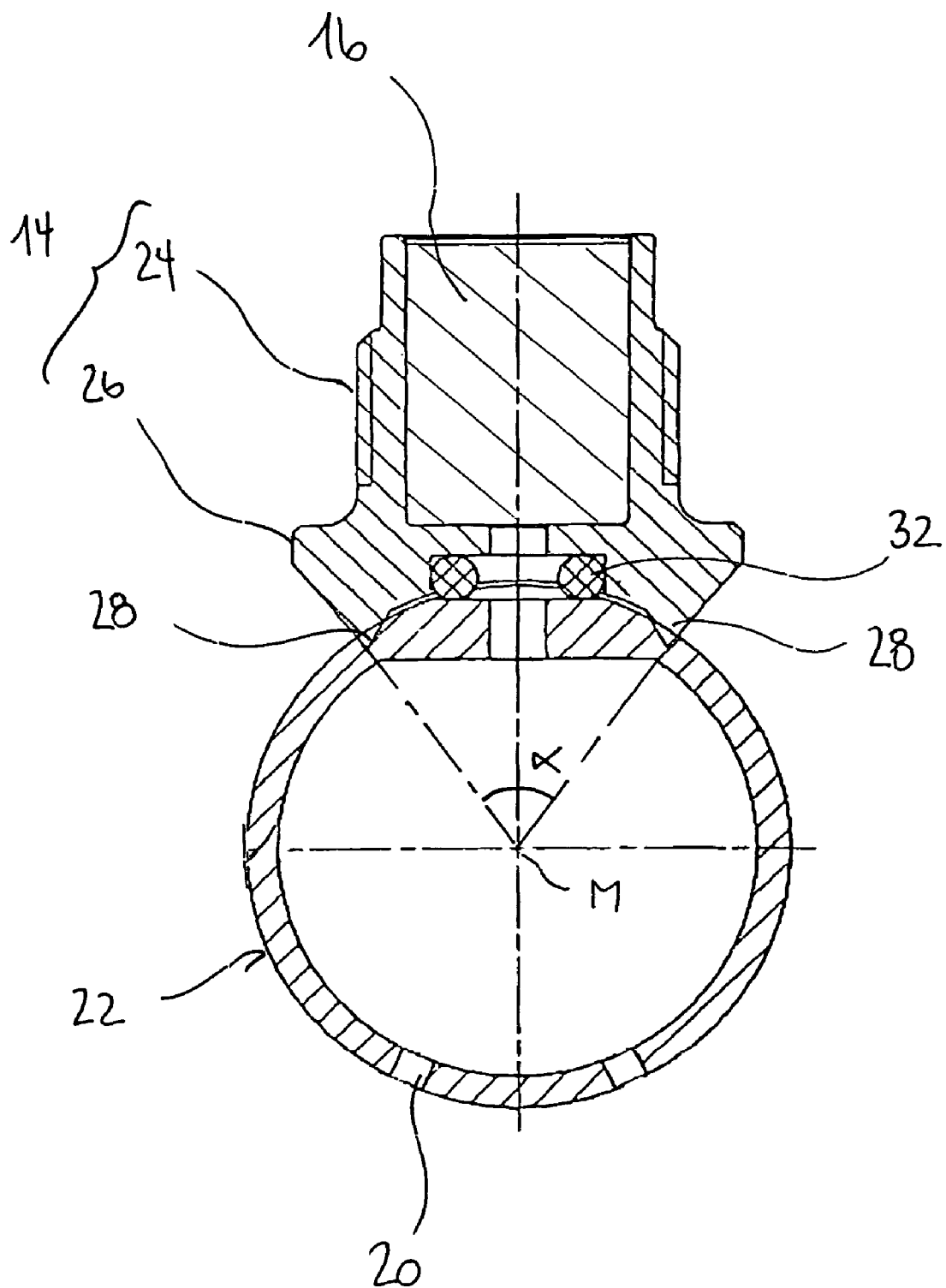
FIG. 4 shows a sectional view of the gas generator along the line IV-IV in FIG. 2.

In FIG. 2 the gas generator 10 is shown in further detail, in which the connecting pieces 14 serve solely for the fastening of the gas generator 10, whereas according to FIGS. 3 and 4 the connecting pieces 14 additionally receives the ignition arrangement 16. The connecting pieces 14 are studs.

Each connecting piece 14 consists of a pin-shaped section 24 and a flange section 26 which is arranged on the housing side. Here, the pin-shaped section 24 and the flange section 26 may form a pre-assembled unit in one piece or may only be joined together subsequently, for example by means of the friction welding method.

The flange section 26 is plate-shaped, projects laterally with respect to the section 24 and has laterally opposing extensions 28 which lie on the side facing the gas generator housing 22 and are spaced apart in peripheral direction. Between the extensions 28, the flange section 26 has a recess 29 which is dimensioned so that the gas generator housing 23 does not abut the recessed section. The gas generator housing 22 and the flange section 26 consequently touch each other only at the extensions 28. The rod-shaped extensions 28 form two contact lines 30 which are arranged parallel to each other. On the contact lines 30, the connecting piece 14 is welded laterally to the gas generator housing 22 by means of condenser discharge welding.

Alternatively, also more than two extensions 28 can be provided, by for example a recess 31, as shown by broken lines in FIG. 2, being provided between axially spaced extensions 28. Therefore, a punctual extension 28 is produced at each corner of the flange section 26.

An angle α between the extensions 28, which are spaced apart in peripheral direction, starting from the central point M of the gas generator housing 22, preferably amounts to between 15 degrees and 90 degrees (FIG. 4).

The connecting piece 14, which houses the ignition arrangement 16, represented in FIGS. 3 and 4 as a block, receives a seal 32 which is arranged between the connecting piece 14 and the gas generator housing 22 and is constructed for example as an O-ring or as a cylindrical sealing element. By receiving the ignition arrangement 16 in the connecting piece 14, the structure of the gas generator 10 can be adapted individually to the various conditions of use.

Figure 5:
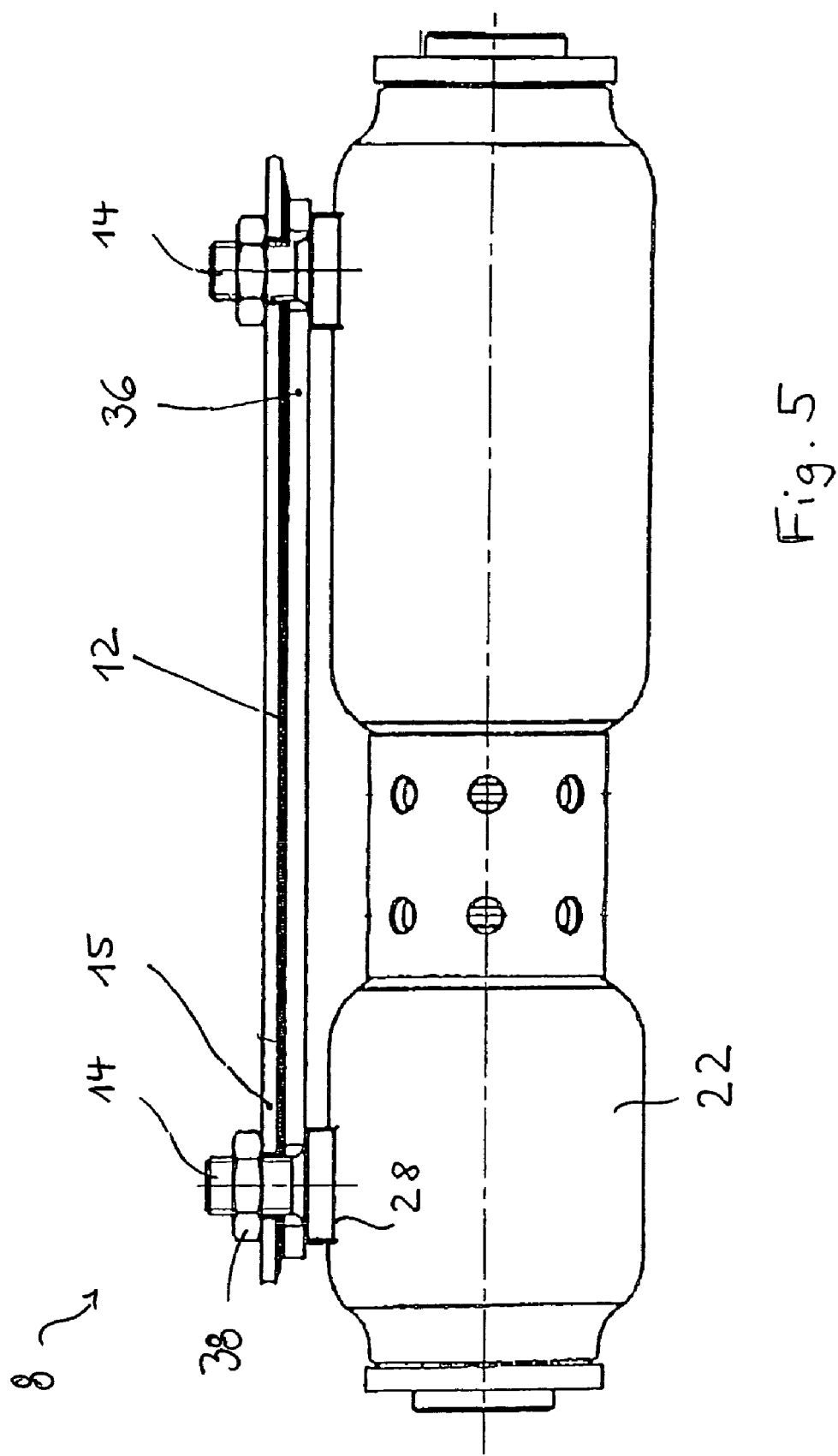
FIG. 5 shows a side view of the gas generator according to the invention in accordance with a second embodiment.

FIG. 5 shows the gas generator 10 in a gas bag module 8. The connecting pieces 14, which are arranged parallel to each other, serve for the fastening of the gas generator 10. A module wall 15 surrounds the gas generator 10. Parallel thereto runs a transverse strut 36 which is placed onto the connecting pieces 14 or is welded to them. The gas bag 12 is clamped between the module wall 15 and the transverse strut 36. This arrangement prevents the force originating from the unfolding gas bag 12 from being able to arrive into the generator housing 22.

The gas bag 12 can also be clamped between the flange section 26 and a holding piece, in which the holding piece may be the module wall 15 or a nut 38 (see FIG. 5).

The invention claimed is:

1. A gas generator with a cylindrical gas generator housing (22) and with a connecting piece (14) which is welded to said gas generator housing (22), said connecting piece (14) having extensions (28) spaced apart in a peripheral direction on the side facing said gas generator housing (22) and having a recess (29) between said extensions (28), and said connecting piece (14) contacting the outer side of said housing (22) and being welded to said gas generator housing (22) at said extensions (28), wherein said connecting piece (14) is adapted to receive an ignition arrangement (16) and a seal (32) is arranged between said connecting piece (14) and said gas generator housing (22), wherein said ignition arrangement (16) is positioned radially outward of the housing (22), said seal (32) being positioned radially between the ignition arrangement (16) and the housing (22).

2. The gas generator according to claim 1, further comprising extensions (28) which are spaced apart axially in relation to said gas generator housing (22) by a recess (31).

3. The gas generator according to claim 1, wherein said connecting piece (14) is welded to said gas generator housing (22) via at least two contact lines (30).

4. The gas generator according to claim 3, wherein said contact lines (30) are arranged parallel to each other.

5. The gas generator according to claim 1, wherein said gas generator housing (22) has a central point, and an angle between the extensions (28), which are spaced apart in peripheral direction, starting from the central point of said gas generator housing (22), amounts to between 15 degrees and 90 degrees.

6. The gas generator according to claim 1, wherein said connecting piece (14) is welded to said gas generator housing (22) by means of condenser discharge welding.

7. The gas generator according to claim 1, wherein said connecting piece (14) is a fastener for said gas generator (10).

8. A gas bag module comprising:
a gas generator having a cylindrical gas generator housing (22) and a connecting piece (14) which is welded to said gas generator housing (22), said connecting piece (14) having extensions (28) spaced apart in peripheral direction on the side facing said gas generator housing (22) and having a recess (31) between said extensions (28), and said connecting piece (14) being welded to said gas generator housing (22) at said extensions (28) wherein said connecting piece (14) has a pin-shaped section (24) and a flange section (26) on the side facing the gas generator housing (22), said flange section (26) having said extensions (28), and said pin-shaped section (24) extending from said flange section (26) away from said gas generator housing (22), and
a modular wall (15) and a gas bag (12) clamped between said flange section (26) and a holding piece (38).

9. The gas bag module according to claim 8, wherein said pin-shaped section (24) and said flange section (26) form a one-piece pre-assembled unit.

10. The gas bag module according to claim 8, wherein said flange section (26) is plate-shaped and projects laterally with respect to said pin-shaped section (28).

* * * * *

UNITED STATES PATENT AND TRADEMARK OFFICE
CERTIFICATE OF CORRECTION

| | | |
|---|---|---|
| PATENT NO. | : 7,631,888 B2 | Page 1 of 1 |
| APPLICATION NO. | : 11/268318 | |
| DATED | : December 15, 2009 | |
| INVENTOR(S) | : Seidl et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 799 days.

Signed and Sealed this

Second Day of November, 2010

David J. Kappos
*Director of the United States Patent and Trademark Office*